US009108249B2

(12) United States Patent
Jäger

(10) Patent No.: US 9,108,249 B2
(45) Date of Patent: Aug. 18, 2015

(54) CUTTING INSERT AND ASSOCIATED DRILLING TOOL

(75) Inventor: Horst Manfred Jäger, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 614 days.

(21) Appl. No.: 13/368,905

(22) Filed: Feb. 8, 2012

(65) Prior Publication Data

US 2012/0201618 A1    Aug. 9, 2012

(30) Foreign Application Priority Data

Feb. 9, 2011  (DE) .......................... 10 2011 010 723

(51) Int. Cl.
*B23B 27/16* (2006.01)
*B23B 51/04* (2006.01)

(52) U.S. Cl.
CPC ........... *B23B 27/1614* (2013.01); *B23B 51/048* (2013.01); *B23B 2200/0423* (2013.01); *B23B 2200/28* (2013.01); *B23B 2205/12* (2013.01); *B23B 2251/60* (2013.01); *Y10T 408/892* (2015.01); *Y10T 408/9098* (2015.01)

(58) Field of Classification Search
CPC .................. B23B 2200/0423; B23B 2200/049
USPC ......... 408/225, 224, 223, 227, 230, 231, 233, 408/703
See application file for complete search history.

(56) References Cited

U.S. PATENT DOCUMENTS

| 1,459,805 | A | * | 6/1923 | Tasker ............................. 407/77 |
| 4,475,851 | A |   | 10/1984 | Hale |
| 4,531,867 | A |   | 7/1985 | Benhase |
| 4,558,975 | A |   | 12/1985 | Hale |
| 4,889,456 | A | * | 12/1989 | Killinger ........................ 408/224 |
| 5,269,618 | A | * | 12/1993 | Meyer ............................ 408/188 |
| 5,354,156 | A | * | 10/1994 | von Haas et al. ............. 408/223 |
| 6,238,151 | B1 |  | 5/2001 | Takagi |
| 7,410,332 | B2 | * | 8/2008 | Scherbarth ..................... 407/113 |

FOREIGN PATENT DOCUMENTS

| DE | 19942440 A1 | 3/2000 |
| EP | 0112136 A3 | 12/1983 |
| JP | 2001150219 A | * 6/2001 |

OTHER PUBLICATIONS

English Translation of JP 2001150219A.*

(Continued)

*Primary Examiner* — Sunil K Singh
*Assistant Examiner* — Alan Snyder
(74) *Attorney, Agent, or Firm* — Larry R. Meenan

(57) ABSTRACT

A cutting insert for use in a drilling tool includes two end faces disposed perpendicular to an insert axis and a plurality of side walls connecting the end faces. Supporting surfaces for bearing against corresponding mating supporting surfaces of a cutting insert receptacle of the drilling tool are formed on at least two of the side walls arranged in a rear region of the cutting insert. A main lip for machining a workpiece to be drilled is formed on at least one side wall arranged in a front region of the cutting insert. The side walls having the supporting surfaces are arranged in such a way that the cutting insert can be inserted into a trigon cutting insert receptacle in an accurately fitting manner.

12 Claims, 4 Drawing Sheets

(56) References Cited

OTHER PUBLICATIONS

German Patent and Trademark Office, "First Office Action", Nov. 8, 2011, 7 pp.

UK Intellectual Property Office, "Examination Report under Section 18(3) for corresponding application GB1202226.5", Apr. 14, 2015, 4 pp.

* cited by examiner

CUTTING INSERT AND ASSOCIATED DRILLING TOOL

BACKGROUND

1. Field of the Invention

The invention generally relates to cutting inserts for use in drilling tools and, more particularly, to cutting inserts for use in drilling tools for drilling a stack of plates. The invention also relates to a device for drilling a stack consisting of a plurality of unconnected plates.

2. Background Information

High-performance drilling tools can often be fitted with interchangeable cutting inserts on which the chip-removing cutting edges are formed. The cutting edges, which are exposed to high wear during the drilling operation, can therefore simply be interchanged, while the drilling tool can continue to be used. For retaining the one or each cutting insert in a fixed position, the drilling tool is provided at a drilling head with a corresponding number of cutting insert receptacles, each of which is formed complementary to the outer contour of the respectively associated cutting insert, such that the cutting insert can be inserted into the receptacle in an accurately fitting manner.

In order to be especially useful, such a cutting insert is often designed as a multi-edge indexable insert, which can be fastened in the receptacle in various orientations, in each case one of a plurality of main lips being in the intended working position in each orientation provided.

A special type of such a multi-edge indexable insert is the "trigon cutting insert", which is described, for example, in U.S. Pat. No. 5,354,156 A. In a plan view of its end faces, such a trigon cutting insert has the shape of a hexagon having three equal "acute" corner angles $\alpha$ (where $60°<\alpha<20°$) and three equal obtuse corner angles $\beta$ (where $180°>\beta>120°$), wherein obtuse and acute corner angles alternate with one another. In a typical form, the acute corner angles have, for example, a magnitude of 84°, whereas the obtuse corner angles have a magnitude of 156°. A conventional trigon cutting insert has three main lips, of which one in each case extends between two acute corner angles. Each main lip extends in this case over one of the obtuse corner angles and is subdivided by the latter into two sections set relative to one another.

A corresponding trigon cutting insert receptacle in the drilling tool is normally formed by a recess which has a substantially axially-tangentially oriented bearing surface which is partly bordered by side walls. In this case, two rear side walls, i.e. side walls facing the shank end, enclose an angle corresponding to the acute angle of the trigon cutting insert. Here, the receptacle is normally oriented in such a way that an angle bisector of this acute angle is either oriented parallel to the tool axis of the drilling tool or is inclined slightly relative to the tool axis, such that the angle bisector runs slightly outward toward the tip of the drilling head. In a normal standard drilling tool, the inclination of the or each cutting insert receptacle (i.e. the setting angle of the angle bisector relative to the tool axis) is in this case always smaller than half the acute angle of the trigon cutting insert. This orientation of the cutting insert receptacle orients the inserted trigon cutting insert, in which the two bisectors of the active main lip are set in opposition with respect to a radial plane perpendicular to the tool axis. Whereas the externally cutting bisector (and therefore the bisector further away from the tool axis) runs radially outward away from the tip of the drilling head, the internally cutting bisector (and therefore the bisector situated closer to the tool axis) runs radially outward toward the tip of the drilling head.

During the drilling operation (and thus during rotation about the tool axis), the two bisectors of the active main lip therefore always produce an annular groove at the bottom of the drill hole, the base line or apex line of which is formed by the obtuse angle between the two bisectors.

During the drilling of workpieces from the solid, this design of the drilling tool and of the cutting inserts is advantageous for a balanced distribution of the cutting forces. However, this design is problematical when drilling unconnected stacks of plates. This is because, in this application, every time the active main lip reaches a plate limit with the obtuse corner angle which lies between the bisectors, an annular material region is cut free in the region of the internally cutting bisector, and this annular material region rotates with the drilling tool and therefore at least makes the further drilling operation more difficult, if not even impossible. In addition, the material ring cut free can also jam the drilling tool, which in the worst case can lead to the destruction of the trigon cutting insert or even of the entire drilling tool.

To avoid this problem, it is known from U.S. Pat. No. 5,269,618 A to increase the inclination of the trigon cutting insert receptacle in such a way that the inner bisector of the active cutting edge of the inserted trigon cutting insert runs at least at right angles to the tool axis or even runs away (in turn radially outwardly) from the front side of the drilling tool.

However, since such a design, as mentioned, is disadvantageous for the distribution of the cutting forces, a special tool is created by the inclination of the trigon cutting insert receptacles according to U.S. Pat. No. 5,269,618 A, the advantages of which only prevail when drilling loose stacks of plates. In view of the relatively low frequency of this application, such a special tool represents a disproportionately high investment in particular for smaller firms.

Accordingly, there exists a need for a device which on the one hand can be used advantageously for drilling unconnected stacks of plates, but on the other hand can also be flexibly used or re-set for other purposes.

SUMMARY OF THE INVENTION

Such needs and others are addressed by embodiments of the present invention.

As one aspect of the invention a cutting insert comprises two end faces perpendicular to an insert axis and a number of side walls which connect the end faces. In this case, supporting surfaces which serve for bearing against corresponding mating supporting surfaces of a cutting insert receptacle of the drilling tool are formed on at least two side walls arranged in a rear region of the cutting insert (a region facing the shank end of the drilling tool in the fitted state). Furthermore, a main lip for machining a workpiece to be drilled is formed on at least one side wall arranged in a front region of the cutting insert. In this case, the side walls having the supporting surfaces are arranged in such a way that the cutting insert can be inserted into a trigon cutting insert receptacle in an accurately fitting manner. In contrast, the side wall having the main lip or—if the main lip extends over a plurality of side walls—the side walls having the main lip is/are oriented asymmetrically, such that an internally cutting end of the main lip is arranged at a greater distance from the insert axis than the other, externally cutting end. In a preferred embodiment, the distance between the internally cutting end of the main lip and the insert axis exceeds the distance between the externally cutting end of the main lip and the insert axis by 5% to 15%, preferably by about 10% (measured at the magnitude of the last-mentioned distance).

In short, the rear region of the cutting insert according to the invention therefore has the shape of a normal trigon cutting insert, whereas the symmetry of the trigon shape is interrupted in the front region, having the main lip, of the cutting insert by virtue of the fact that the side wall or side walls is/are tilted asymmetrically in this region relative to the trigon shape. As a result of the tilting of the main lip, the cutting insert according to the invention has the shape of an irregular polygon in plan view along the insert axis. Therefore, for conceptually distinguishing the cutting insert according to the invention from the regularly shaped trigon cutting insert, the cutting insert according to the invention is also designated as "polygonal cutting insert".

The term "side wall" in this case generally designates an outer surface of the cutting insert, the outer surface being bounded by (sharp or rounded) edges of the end faces and the adjoining side walls. Designated as "internally cutting" end of the main lip is that end of the main lip which faces the tool axis in the fitted position in accordance with the intended purpose. Designated as "externally cutting" end of the main lip is accordingly that end of the main lip which is remote from the tool axis in the fitted position in accordance with the intended purpose.

In an expedient variant of the invention, the main lip, in a manner similar to that of a normal trigon cutting insert, is formed from two rectilinear bisectors, between which an obtuse (bisector) angle is formed. In an alternative variant, the main lip is concavely curved, such that an obtuse (tangent) angle is formed between an inner tangent which touches the main lip in the region of the internally cutting end and an outer tangent which touches the main lip in the region of the externally cutting end. In this case, the bisector angle or the tangent angle preferably has a magnitude of between 165° and 175°, in particular about 170°.

In its rear region, the cutting insert according to the invention preferably has two side walls which are diametrically opposite the main lip. In accordance with the trigon shape, these two side walls are oriented symmetrically to one another, such that the angle bisector of the angle formed between these side walls intersects the insert axis. This (first) angle is the acute angle of the trigon shape. Accordingly, this angle is expediently less than 120° but greater than 60°.

The side wall running from the first angle toward the externally cutting end of the main lip is designated below as "first" side wall. The side wall running from the first angle toward the internally cutting end of the main lip is designated below as "second" side wall. This second side wall adjoins a third side wall at a second angle. In accordance with the trigon shape, the second and the third side walls are preferably also oriented symmetrically relative to one another, such that the angle bisector of the second angle also intersects the insert axis. The second angle is the obtuse angle of the trigon shape. Accordingly, the second angle is expediently less than 180° but greater than 120°. The first angle and the second angle are expediently selected in such a way that the sum thereof is 240°. An angle of 60° is suitably formed between the first angle bisector and the second angle bisector. In a preferred configuration, the first angle has a magnitude of about 84° and the second angle has a magnitude of about 156°.

Angles between edges and side walls of the cutting insert are always specified here and below as inner angles. Therefore those angles are specified which the edges and side walls enclose as viewed from the interior of the cutting insert. In the case of two intersecting straight lines, such as, for example, the first and the second angle bisectors, the smaller angle of intersection (i.e. an angle of intersection falling below 90°) is always specified.

In a preferred configuration, in deviation from the trigon shape, the first side wall, as viewed in the circumferential direction, is designed to be longer than the second side wall. Additionally or alternatively, the third side wall, as viewed in the circumferential direction, is also preferably designed to be longer than the second side wall. Alternatively and additionally thereto, provision is made for a fourth side wall to be arranged between the third side wall and the internally cutting end of the main lip. A secondary lip is preferably formed on that side wall which adjoins the externally cutting end of the main lip. In this case, in advantageous dimensioning of the cutting insert, an angle having a magnitude of between 90° and 115°, preferably between 95° and 110°, and in particular of about 102°, is formed between the main lip and the secondary lip.

As another aspect of the invention, a drilling tool and (at least) one cutting insert of the type according to the invention is provided. The drilling tool comprises a drilling head and a shank end opposed thereto and also a tool axis which extends between the drilling head and the shank end. Furthermore, the drilling tool comprises a number of cutting insert receptacles which corresponds to the number of cutting inserts to be fitted, which cutting insert receptacle(s) is/are arranged eccentrically with respect to the tool axis. The or each cutting insert receptacle is provided and suitable for accommodating normal trigon cutting inserts and is therefore designated below as "trigon cutting insert receptacle". In this case, the or each trigon cutting insert receptacle is dimensioned in such a way that the cutting insert according to the invention can also be inserted into it in an accurately fitting manner.

In a preferred embodiment of the invention, the or each trigon cutting insert receptacle is oriented with respect to the tool axis in such a way that the main lip of the cutting insert according to the invention, with respect to the tool axis, does not run radially outward away from the shank end over the entire length thereof in the inserted state. In other words, the shank-end-side angle between the tool axis and the main lip or the tangent in contact with the main lip is less than or equal to 90° at each point of the main lip. Again in other words, the main lip of the inserted cutting insert is oriented either perpendicularly to the tool axis or runs radially outward toward the shank end in every linear section.

In accordance with a normal trigon cutting insert receptacle, the or each cutting insert receptacle of the drilling tool according to the invention expediently has a seating surface, onto which the cutting insert is placed with an associated end face for fitting in accordance with the intended purpose, and a plurality of side walls which are oriented approximately perpendicularly to this seating surface and which come to bear as mating supporting surfaces against corresponding supporting surfaces of the cutting insert.

Here, the trigon cutting insert receptacle has in particular a first side wall for bearing against the (above-described) first side wall of the cutting insert and a second side wall for bearing against the second side wall of the cutting insert. A first angle formed between these side walls of the receptacle corresponds in this case to the acute angle of the rear trigon contour of the cutting insert and is therefore less than 120° and greater than 60°. In a preferred design of the drilling tool, the angle bisector of this first angle is oriented parallel to the tool axis. Alternatively, however, the angle bisector can also be tilted by a setting angle relative to the tool axis, such that the angle bisector runs away from the tool axis toward the tip of the drilling head. In an advantageous embodiment of the drilling tool, the magnitude of this setting angle, measured on the drilling-head side, is in this case between 0° and half the magnitude of the first angle.

The bearing surface of the trigon cutting insert receptacle is expediently oriented with respect to the tool axis substantially in an axially-tangentially oriented plane, such that the main lip of the inserted cutting insert, as viewed in projection along the tool axis, runs approximately radially to the latter.

In short, an exemplary device according to the invention comprises a drilling tool having a drilling head, in which a normal trigon cutting insert receptacle is made, and a polygonal cutting insert which can be detachably inserted into the trigon cutting insert receptacle, wherein this polygonal cutting insert has a trigon contour at the rear and a main lip at the front which is tilted asymmetrically relative to the trigon shape. The cutting edge is preferably designed in this case to match the position of the cutting insert receptacle in such a way that it does not run away from a shank end of the drilling tool in any linear section (as viewed from inside to outside) in the inserted state of the polygonal cutting insert.

The shape according to the invention of the polygonal cutting insert makes it possible in particular for conventional drilling tools which are provided with cutting insert receptacles for normal trigon cutting inserts to also be advantageously used for drilling unconnected stacks of plates. This is because a drill hole is peeled out by the asymmetrically tilted main lip, the bottom of which drill hole does not rise toward the axis of the drill hole at any point. In other words, the depth of the drill hole does not increase radially outward at any point. Therefore, unlike when using normal trigon cutting inserts, freely movable ring structures cannot be cut free when drilling stacks of plates with the device according to the invention.

A further advantage of the invention lies in the fact that the drilling tool of the device according to the invention can alternatively also be fitted with normal trigon cutting inserts and can be advantageously used in a conventional manner in this configuration for drilling workpieces from the solid. The drilling tool is therefore versatile per se and, for drilling unconnected stacks of plates, merely has to be fitted with the polygonal cutting inserts according to the invention.

In a preferred embodiment, the drilling tool according to the invention has a plurality of trigon cutting insert receptacles, in particular two trigon cutting insert receptacles, which are expediently arranged radially opposite one another with respect to the tool axis. In a preferred embodiment, a centering drill (also designated as pilot) is arranged in a central position between the trigon cutting insert receptacles, which centering drill is optionally integral with the drilling tool or is produced as a separate part which is screwed or brazed to a drilling head of the drilling tool. In an alternative embodiment, such a centering drill is not provided. In this case, the trigon cutting insert receptacles are expediently arranged offset from the tool axis in respect of their radial position, such that one cutting insert receptacle directly adjoins the tool axis, whereas one or more further cutting insert receptacles are arranged at a distance from the axis.

On account of its asymmetry, the cutting insert according to the invention is not an indexable cutting insert. Accordingly, it expediently has only one main lip.

BRIEF DESCRIPTION OF THE DRAWINGS

An exemplary embodiment of the invention is explained in more detail below with reference to a drawing, in which.

Parts and dimensions corresponding to one another are provided with the same designations throughout the figures.

DESCRIPTION OF AN EXEMPLARY EMBODIMENT

Figure 1:
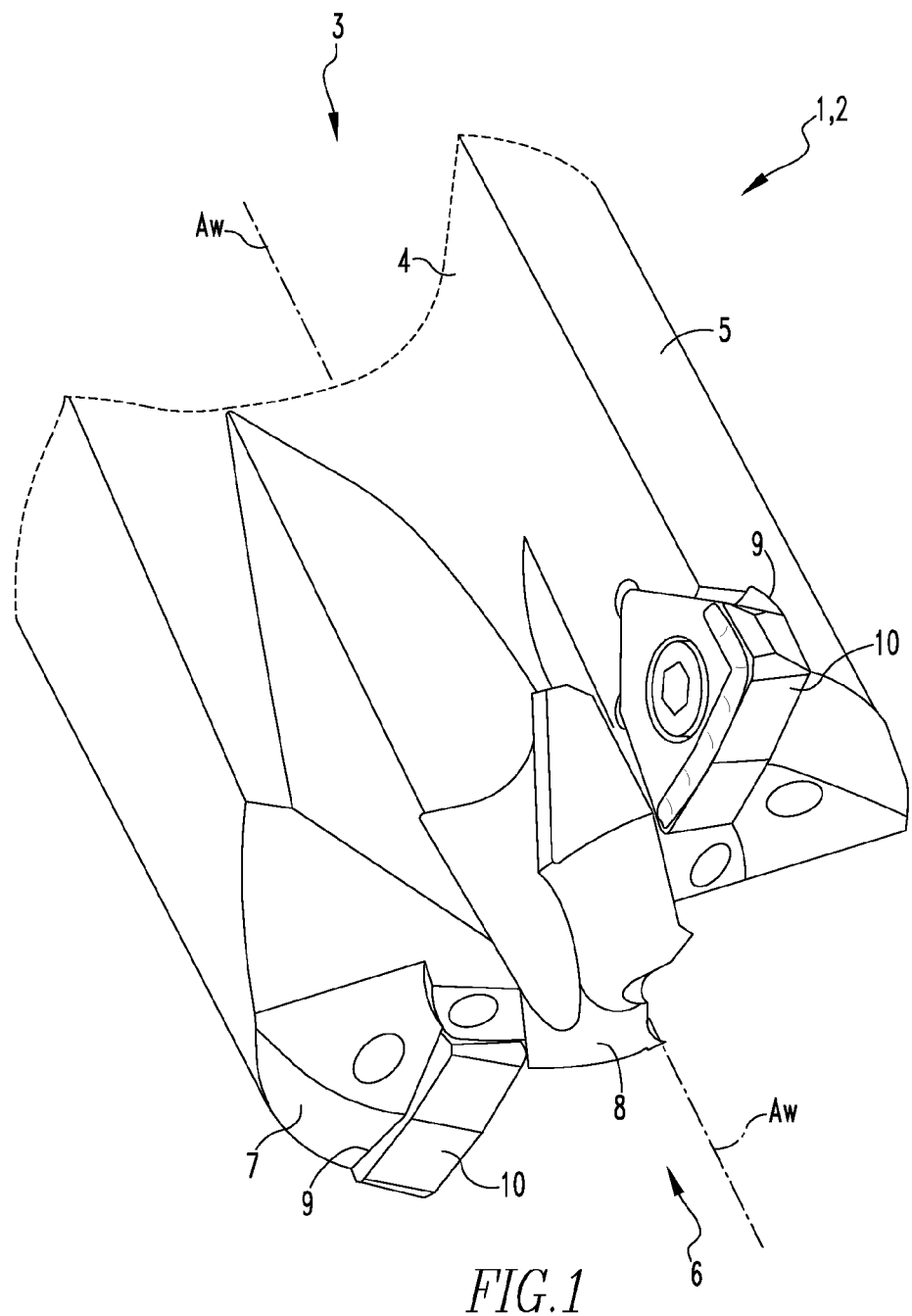
FIG. 1 shows, in a perspective illustration, a drilling head of a drilling tool in accordance with the present invention having two trigon cutting insert receptacles, into which a respective polygonal cutting insert according to the invention is inserted.

FIG. 1 shows a drilling head 1 of a drilling tool 2 shown in a cutaway view. On a rear shank end 3, the drilling tool 2 comprises a drilling shank (not shown here) which serves for fastening the drilling tool 2 in a drilling machine. The drilling shank can be integrally connected to the drilling head 1. Alternatively, the drilling shank and the drilling head 1 can be formed from components which are produced separately and are only connected subsequently (e.g. by screwed connection or brazing).

The drilling head 1 is designed in a manner known per se as a cylindrical body, from which two helical flutes for the removal of drillings are cut out. In this case, the drilling head 1 has a surface designated as inner surface 4 in the interior of each flute and a surface designated as circumferential surface 5 on the cylinder circumference. That region of the surface which is located at a front side 6 facing a workpiece during a drilling operation is designated as front face 7 of the drilling head 1.

The cylinder axis of the drilling tool 2 which extends between the shank end 3 and the drilling head 6 and about which the drilling tool 2 is rotated when operated in accordance with the intended purpose is designated below as tool axis Aw.

In the embodiment shown here, the drilling head 1 comprises a centring drill which is designated below as pilot 8 and which serves substantially for pre-drilling and for centering the drilling tool 2 during the drilling operation. Furthermore, the drilling head 1 comprises two (trigon cutting insert) receptacles 9, into which a respective (polygonal) cutting insert 10 according to the invention is inserted for drilling a stack of steel plates placed loosely one on top of the other. Each of the two receptacles 9 is made in the drilling head 1 in the region of the front side 6, the two receptacles 9 being opposite one another in the radial direction and flanking pilots 8 from radially opposite sides.

Figure 2:
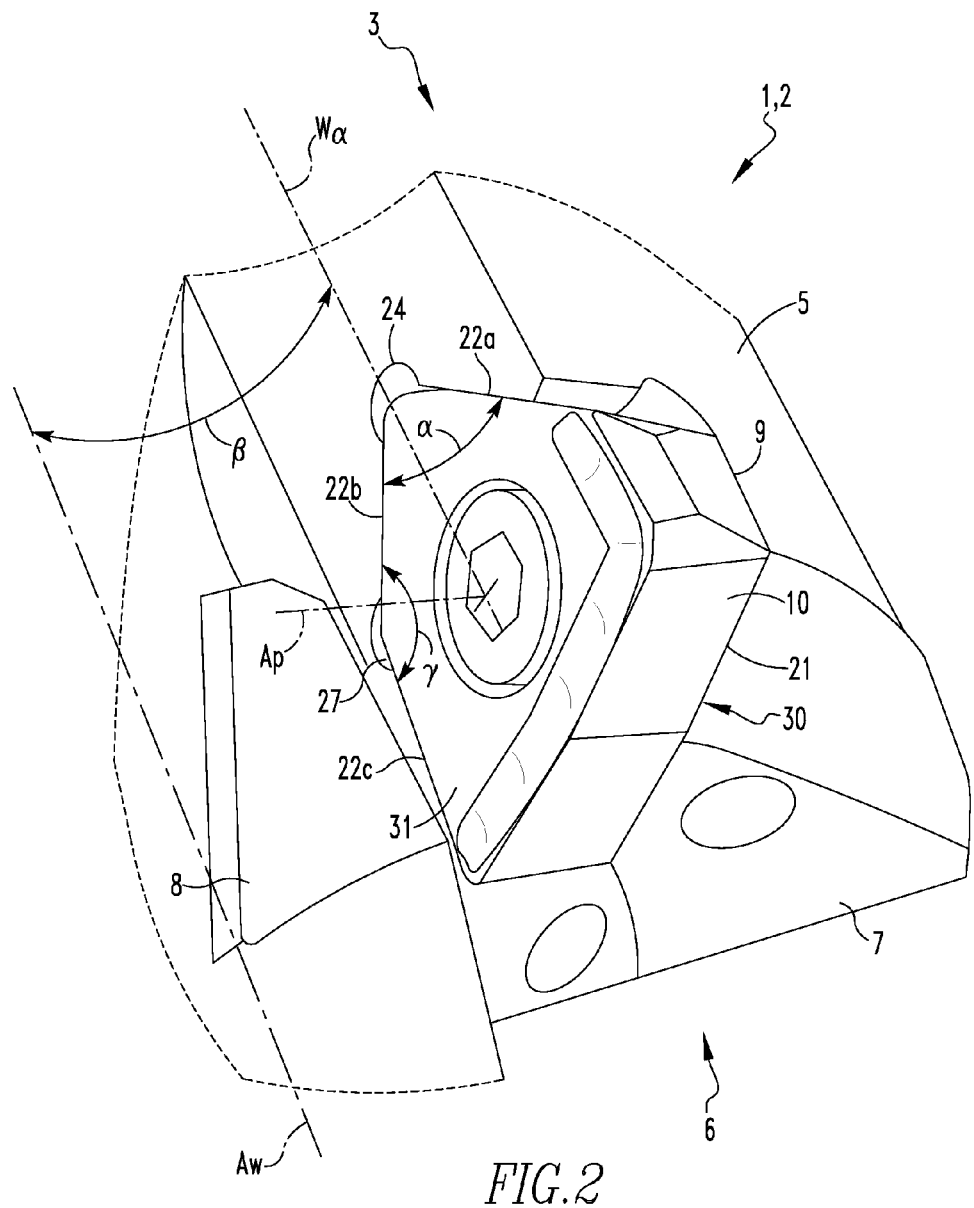
FIG. 2 shows one of the cutting insert receptacles and one of the polygonal cutting inserts according to FIG. 1 in an enlarged illustration.

According to FIG. 2, each receptacle 9 is formed substantially by a recess which starts from the inner surface 4 of an associated flute. Each receptacle 9 comprises a bearing surface 21 defined approximately tangentially-axially with respect to the tool axis Aw. The bearing surface 21 is bounded toward the shank end 3 and toward the tool axis Aw by three side walls 22a, 22b and 22c angled approximately perpendicularly to the bearing surface 21.

In this case, a first side wall 22a encloses an angle α of about 84° with a second side wall 22b. A radius 24 is cut out of the drilling head 1 at the vertex of this angle α. The angle bisector Wα of the acute angle α is preferably oriented parallel to the tool axis Aw. However, it is also possible for the angle bisector Wα to be inclined by an inclination angle β of, for example, about 5° relative to the tool axis Aw.

A third side wall 22c adjoins the second side wall 22b in the inward radial direction and encloses with the second side wall 22b an obtuse angle γ of about 156°. A further radius 27 is cut out at the vertex of the angle γ.

The first side wall 22a extends radially outward up to the circumferential surface 5 of the drilling head 1, whereas the third side wall 22c extends up to the front face 7 of the drilling head 1. Each of the two receptacles 9 is open toward the front side 7.

The polygonal cutting insert 10 is formed substantially by an irregular polygonal flat body, e.g. made of carbide. Said flat body comprises a first end face 30, which, in the fitted position of the cutting insert 10, bears as intended against the bearing surface 21 of the associated receptacle 9, and a second end face 31 opposite the end face 30. Both end faces 30, 31 have a polygonal outer contour and are approximately congruent to one another. The two end faces 30 and 31 are oriented in a plane-parallel manner to one another and perpendicularly to a central insert axis Ap.

Figure 3:
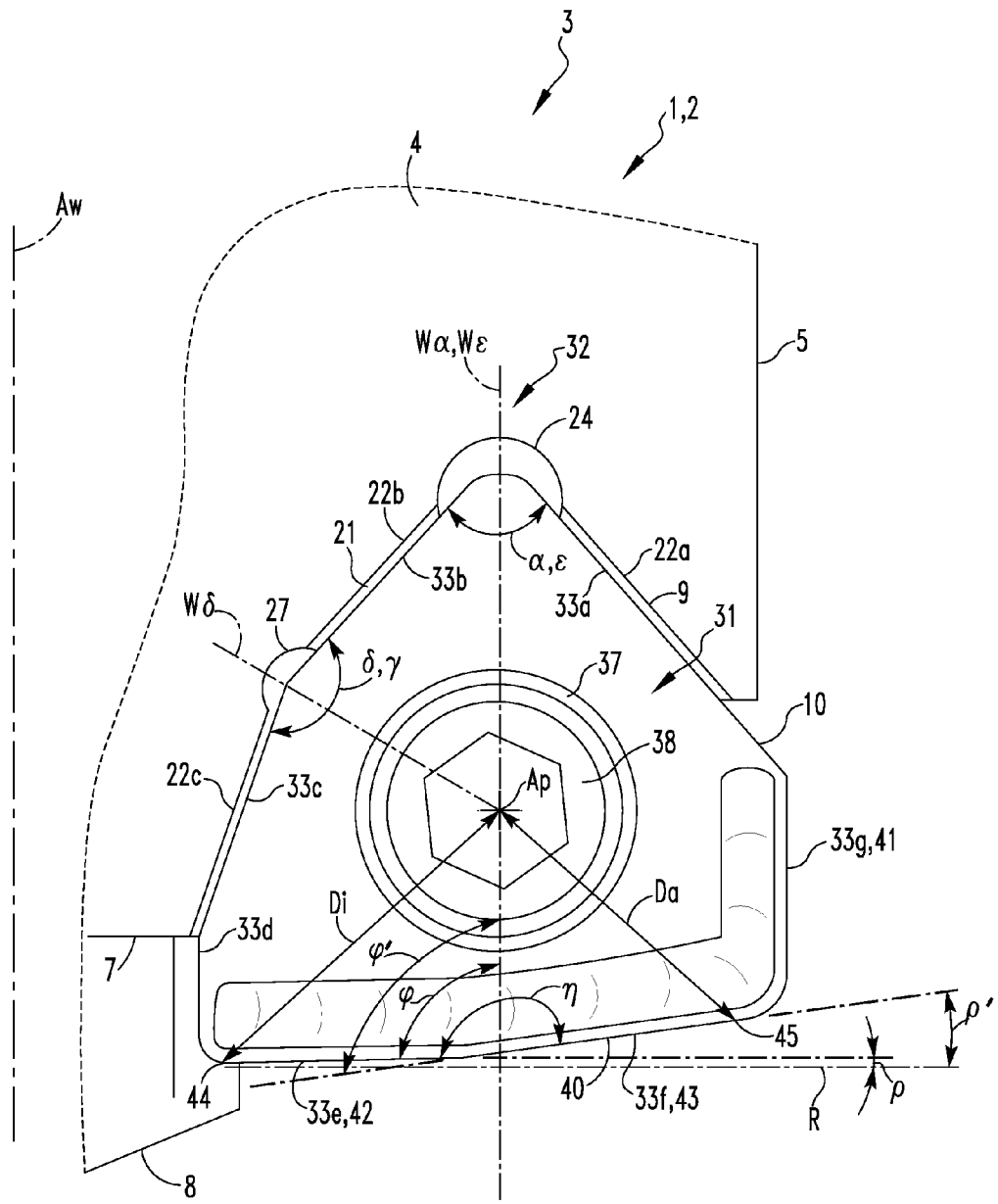
FIG. 3 shows, in a plan view along an insert axis, one of the receptacles and the polygonal cutting insert, inserted therein, according to FIG. 1.

As can be seen in particular from FIG. 3, the polygonal cutting insert 10 has, on the rear side 32, a trigon contour formed complementary to the receptacle 9. Accordingly, on the rear side 32 of the polygonal cutting insert 10, an acute angle ε is formed between a first side wall 33a and a second side wall 33b, said acute angle ε corresponding in magnitude to the angle α of the receptacle 9 and accordingly being about 85°. An obtuse angle δ is formed between the second side wall 33b and a third side wall 33c adjoining radially on the inside, said obtuse angle δ corresponding in magnitude to the angle γ of the receptacle 9 and accordingly being about 156°. The side walls 33a and 33b are set symmetrically to one another, such that the angle bisector Wε of the angle ε intersects the insert axis Ap. The side walls 33b and 33c are likewise set symmetrically to one another, such that the angle bisector Wδ of the angle δ also intersects the insert axis Ap. In this case, the angle bisectors Wε and Wδ enclose a 60° angle with one another. The side walls 33a, 33b and 33c form supporting surfaces which interact with the side walls 22a, 22b and 22c, respectively, of the receptacle 9, which form corresponding mating supporting surfaces. To this end, the side walls 22b and 33b and the side walls 22c and 33c have approximately the same dimensions in each case, such that the polygonal cutting insert 10 can be inserted in this region into the receptacle 9 in an accurately fitting manner.

For fastening, each polygonal cutting insert 10 is screwed down in a tapped hole, made in the respective bearing surface 21 of the corresponding receptacle 9, by means of a respective screw 38 held in a through-hole 37.

The first side face 33a of the cutting insert 10 is larger in the longitudinal extent thereof than the associated side face 22a of the receptacle 9, such that the cutting insert 10 projects circumferentially beyond the drilling head 1.

A comparatively narrow fourth side wall 33d is angled slightly from the third side wall 33c. Adjoining this side wall 33d are a fifth side wall 33e and a sixth side wall 33f, which form a front side of the cutting insert 10 and over which a main lip 40 extends. The side walls 33e and 33f therefore each have a bisector of the main lip 40. The sixth side wall 33f is in turn connected to the first side wall 33a via a seventh side wall 33g. A secondary lip 41 is formed on this seventh side wall 33g.

The side walls 33c and 33f having the main lip 40 are set slightly relative to one another with an opening angle (or bisector angle) η of about 172° via a smoothly rounded edge. The main lip 40 extending over the two side walls 33e and 33f accordingly has a convex line direction having two straight sections 42 and 43, which merge into one another by means of a rounded bend. In the fitted position of the cutting insert 10, the (inner) section 42 is arranged closer to the tool axis Aw than the (outer) section 43 of the main lip. Accordingly, that end of the section 42 which is remote from the section 43 is designated as "internally cutting" end 44 of the main lip 40, whereas that end of the section 43 which is remote from the section 42 is designated as "externally cutting" end 45 of the main lip 40.

On the inside, the sections 42 and 43 of the main lip 40 have a setting angle φ of 91.5° and respectively a setting angle φ' of 98° relative to the angle bisector Wε. As a result, the main lip 40 encloses an external angle ρ or ρ' of 1.5° or 8° with a radial plane R disposed perpendicularly to the tool axis Aw. As viewed radially outward, the main lip 40 therefore does not run in any section onto the front side 6 and thus onto the workpiece to be machined. On account of this asymmetrical course of the main lip 40, the distance Di formed between the internally cutting end 44 and the insert axis Ap is about 1.1 times the distance Da between the externally cutting end 45 and the insert axis Ap. The distance Di therefore exceeds the distance Da by about 10%.

The side wall 33g is set at an angle of about 102° relative to the side wall 33f. Accordingly, the secondary lip 41 is set by the same angle relative to the section 43 of the main lip 40. The secondary lip 41 therefore runs approximately parallel to the tool axis Aw. However, it preferably runs slightly radially inward toward the shank end 3, such that a clearance angle is formed between the secondary lip 41 and the wall of a drill hole machined by the cutting insert 10.

Figure 4:
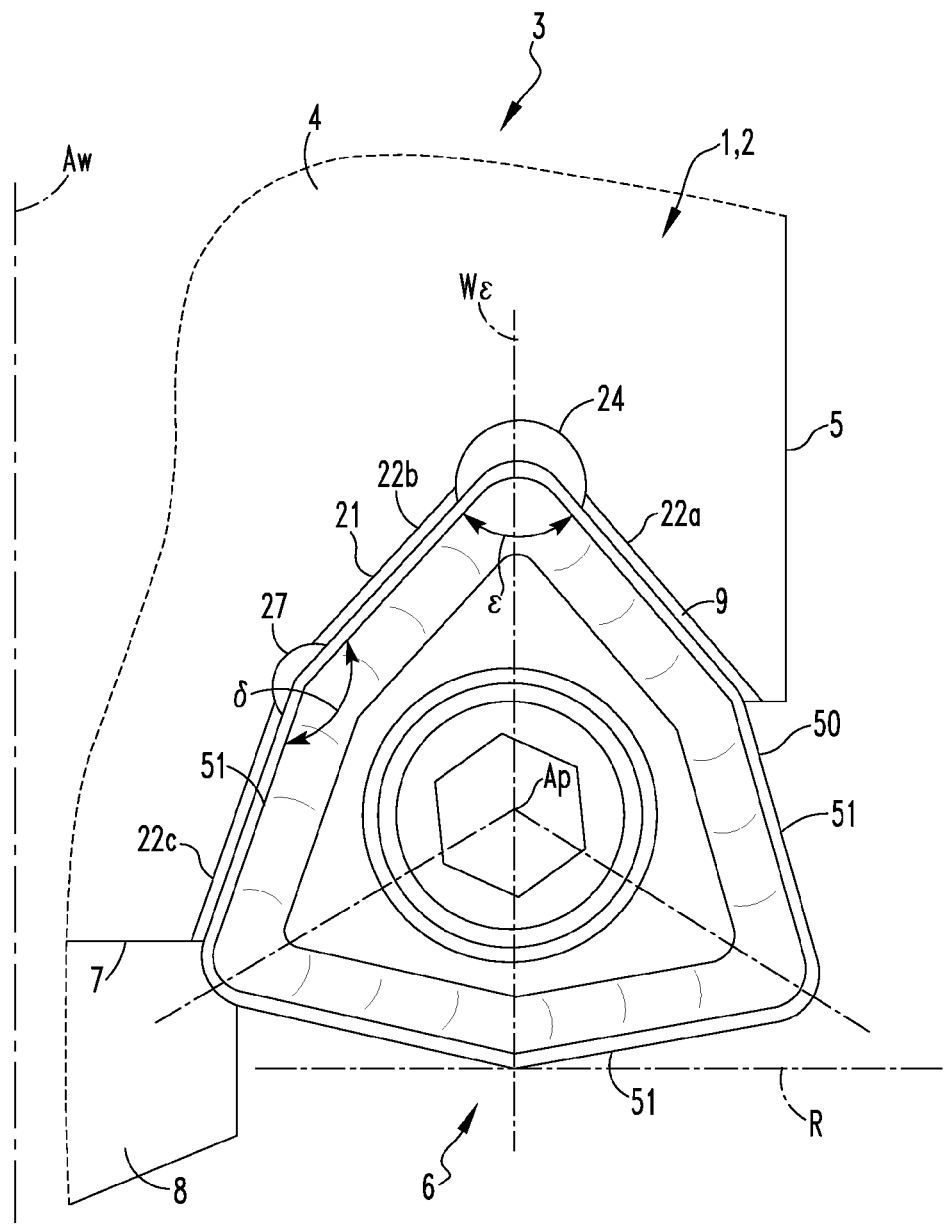
FIG. 4 shows, in an illustration according to FIG. 3, a conventional trigon cutting insert, which is inserted into the cutting insert receptacle according to FIGS. 2 and 3 instead of the polygonal cutting insert according to the invention.

In the embodiment according to FIGS. 1 to 3 which is fitted with the polygonal cutting insert 10 according to the invention, the drilling tool 2 is used as intended for drilling unconnected stacks of plates. In order to drill workpieces from the solid using the same drilling tool 2, the two polygonal cutting inserts 10 are replaced, in accordance with the intended purpose, by conventional trigon cutting inserts 50, as shown in FIG. 4.

In contrast to the polygonal cutting insert 10 according to the invention, each of the two trigon cutting inserts 50 has three identical main lips 51 which are each bent at an obtuse angle δ (where δ=156°) and which in each case enclose with one another the acute angle ε of again about 84°. The individual main lips 51 can be interchanged by a 60° rotation of the trigon cutting insert 50 about the insert axis Ap.

What is claimed is:

1. A cutting insert for use in a drilling tool, the cutting insert comprising:
   two end faces disposed perpendicular to an insert axis and a plurality of side walls connecting the end faces,
   wherein supporting surfaces for bearing against corresponding mating supporting surfaces of a cutting insert receptacle of the drilling tool are formed on at least two of the side walls arranged in a rear region of the cutting insert,
   wherein a main lip for machining a workpiece to be drilled is formed on at least one side wall arranged in a front region of the cutting insert, wherein the side walls having the supporting surfaces are arranged in such a way that the cutting insert can be inserted into a trigon cutting insert receptacle in an accurately fitting manner, characterized in that the side wall having the main lip or the side walls having the main lip is/are oriented asymmetrically, such that an internally cutting end of the main lip is arranged at a greater distance from the insert axis than an externally cutting end of the main lip, and
   wherein the main lip is formed from two rectilinear bisectors, between which an obtuse bisector angle is formed.

2. The cutting insert of claim 1 wherein the distance between the internally cutting end of the main lip and the insert axis exceeds the distance between the externally cutting end of the main lip and the insert axis by 5% to 15%.

3. The cutting insert of claim 2 wherein the distance between the internally cutting end of the main lip and the insert axis exceeds the distance between the externally cutting end of the main lip and the insert axis by 10%.

4. The cutting insert of claim 1, wherein the bisector angle has a magnitude of between 165° and 175°.

5. The cutting insert of claim 1 wherein a secondary lip is formed on a side wall adjoining the externally cutting end of the main lip.

6. The cutting insert of claim 5 wherein an angle formed between the main lip and the secondary lip is between 90° and 115°.

7. The cutting insert of claim 5 wherein an angle formed between the main lip and the secondary lip is between 95° and 110°.

8. The cutting insert of claim 5 wherein an angle formed between the main lip and the secondary lip is about 102°.

9. A device for drilling a workpiece consisting of a plurality of unconnected plates, the device comprising:
- a drilling tool comprising:
  - a drilling head;
  - a shank end disposed opposite the drilling head;
  - a tool axis which extends between the drilling head and the shank end; and
  - a trigon cutting insert receptacle arranged on the drilling head eccentrically with respect to a tool axis; and
- a cutting insert as recited in claim 1, which can be inserted into the trigon cutting insert receptacle of the drilling tool in an accurately fitting manner.

10. The device of claim 9 wherein the trigon cutting insert receptacle is oriented with respect to the tool axis in such a way that the main lip of the cutting insert, with respect to the tool axis, does not run axially forward away from the shank end over the entire radial length thereof.

11. A cutting insert for use in a drilling tool, the cutting insert comprising:
- two end faces disposed perpendicular to an insert axis and a plurality of side walls connecting the end faces,
- wherein supporting surfaces for bearing against corresponding mating supporting surfaces of a cutting insert receptacle of the drilling tool are formed on at least two of the side walls arranged in a rear region of the cutting insert,
- wherein a main lip for machining a workpiece to be drilled is formed on at least one side wall arranged in a front region of the cutting insert, wherein the side walls having the supporting surfaces are arranged in such a way that the cutting insert can be inserted into a trigon cutting insert receptacle in an accurately fitting manner, characterized in that the side wall having the main lip or the side walls having the main lip is/are oriented asymmetrically, such that an internally cutting end of the main lip is arranged at a greater distance from the insert axis than an externally cutting end of the main lip, and
- wherein the main lip is concavely curved, such that an obtuse tangent angle is formed between the inner tangent touching the main lip in the region of the internally cutting end and the outer tangent touching the main lip in the region of the externally cutting end.

12. The cutting insert of claim 11, wherein the tangent angle has a magnitude of between 165° and 175°.

\* \* \* \* \*